United States Patent
Sun et al.

(10) Patent No.: US 12,051,036 B2
(45) Date of Patent: Jul. 30, 2024

(54) SYSTEMS AND METHODS FOR VEHICLE ROUTING

(71) Applicant: Walmart Apollo, LLC, Bentonville, AR (US)

(72) Inventors: Ou Sun, Aliso Viejo, CA (US); Aditya Arcot Srinivasan, Sunnyvale, CA (US); Jing Huang, San Jose, CA (US); Mingang Fu, Palo Alto, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 75 days.

(21) Appl. No.: 17/588,322

(22) Filed: Jan. 30, 2022

(65) Prior Publication Data
US 2023/0245044 A1    Aug. 3, 2023

(51) Int. Cl.
*G06Q 10/00* (2023.01)
*G06Q 10/0835* (2023.01)
*G06Q 10/087* (2023.01)

(52) U.S. Cl.
CPC ..... *G06Q 10/08355* (2013.01); *G06Q 10/087* (2013.01)

(58) Field of Classification Search
CPC ........... G06Q 10/08355; G06Q 10/087; G06Q 10/083
See application file for complete search history.

(56) References Cited

U.S. PATENT DOCUMENTS

| | | | | |
|---|---|---|---|---|
| 5,177,684 A | * | 1/1993 | Harker | B61L 27/12 246/5 |
| 2009/0048890 A1 | * | 2/2009 | Burgh | G06Q 10/06375 705/7.26 |
| 2009/0268232 A1 | | 10/2009 | Niblett, Jr. | |
| 2015/0170094 A1 | * | 6/2015 | Ye | G06Q 10/1097 705/337 |

(Continued)

FOREIGN PATENT DOCUMENTS

GB    2524952    10/2015

OTHER PUBLICATIONS

GeeeksforGeeks "Bin Packing Problem (Minimize number of used bins)," printed on Nov. 13, 2021 at https://www.geeksforgeeks.org/bin-pakcing-problem-minimize-number-of-used-bins; 31 pages Jul. 28, 2021.

(Continued)

*Primary Examiner* — Rokib Masud
(74) *Attorney, Agent, or Firm* — BRYAN CAVE LEIGHTON PAISNER LLP (57) ABSTRACT

Systems and methods including one or more processors and one or more non-transitory storage devices storing computing instructions configured to run on the one or more processors and cause the one or more processors to perform receiving one or more orders comprising a list of one or more pallets; grouping each pallet of the one or more pallets into one or more groups using one or more respective qualities of each respective pallet; for each group of the one or more groups, building one or more stacks of pallets using (Continued)

at least three different stacking models; selecting a final stack list of a model of the at least three different stacking models having a lowest number of stacks; and optimizing the final stack list using a probabilistic model. Other embodiments are disclosed herein.

20 Claims, 5 Drawing Sheets

(56) References Cited

U.S. PATENT DOCUMENTS

2020/0242543 A1  7/2020  Fu et al.

OTHER PUBLICATIONS

Calzavara, G., et al., "Mathematical Models and Heuristic Algorighms for Pallet Building Problems With Practical Constraints," Annals of Operations Research, https://doi.org/10.1007/s10479-021-04349-2/; 32 pgs Oct. 25, 2021.

* cited by examiner

| 401 – Receiving one or more orders |

| 402 – Grouping one or more pallets |

| 403 – Building one or more stacks of pallets |

| 404 – Selecting a final stack list |

| 405 – Optimizing a final stack list |

| 406 – Generating a routing plan or a loading plan |

| 407 – Coordinating displaying a routing plan or a loading plan |

SYSTEMS AND METHODS FOR VEHICLE ROUTING

TECHNICAL FIELD

This disclosure relates generally vehicle routing, and is more specifically related to generating stacks for use in a delivery vehicle.

BACKGROUND

Vehicle routing systems are fairly common in today's world. For example, software applications such as Google Maps and Apple Maps can turn anyone's computer system into a vehicle route generation system. These systems, though, do not always produce an optimal route for every situation. For example, Google Maps and Apple Maps will prioritize a shortest route or a fastest route, but cannot determine an optimum route or set of routes for a delivery vehicle or a delivery vehicle fleet.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and cause the one or more processors to perform receiving one or more orders comprising a list of one or more pallets; grouping each pallet of the one or more pallets into one or more groups using one or more respective qualities of each respective pallet; for each group of the one or more groups, building one or more stacks of pallets using at least three different stacking models; selecting a final stack list of a model of the at least three different stacking models having a lowest number of stacks; and optimizing the final stack list using a probabilistic model.

Various embodiments include a method. The method can be implemented via execution of computing instructions configured to run at one or more processors and configured to be stored at non-transitory computer-readable media. The method can comprise receiving one or more orders comprising a list of one or more pallets; grouping each pallet of the one or more pallets into one or more groups using one or more respective qualities of each respective pallet; for each group of the one or more groups, building one or more stacks of pallets using at least three different stacking models; selecting a final stack list of a model of the at least three different stacking models having a lowest number of stacks; and optimizing the final stack list using a probabilistic model.

Figure 1:
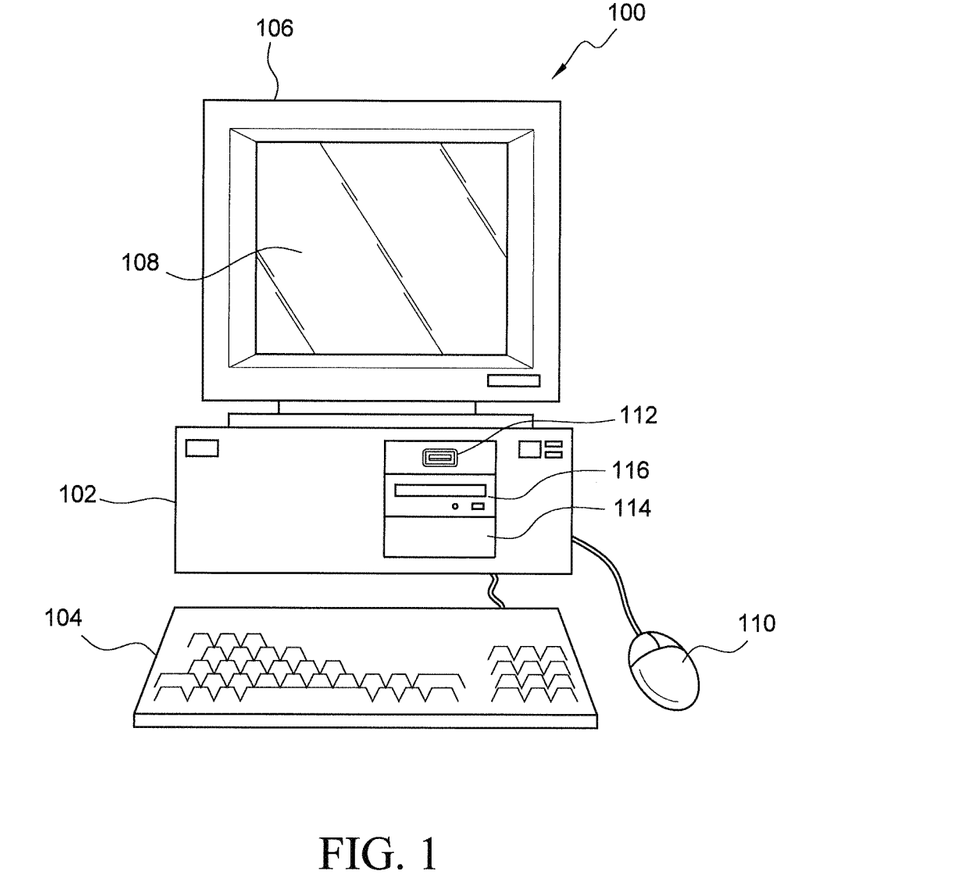
FIG. 1 illustrates a front elevational view of a computer system that is suitable for implementing various embodiments of the systems disclosed in FIGS. 3 and 5.
Figure 2:
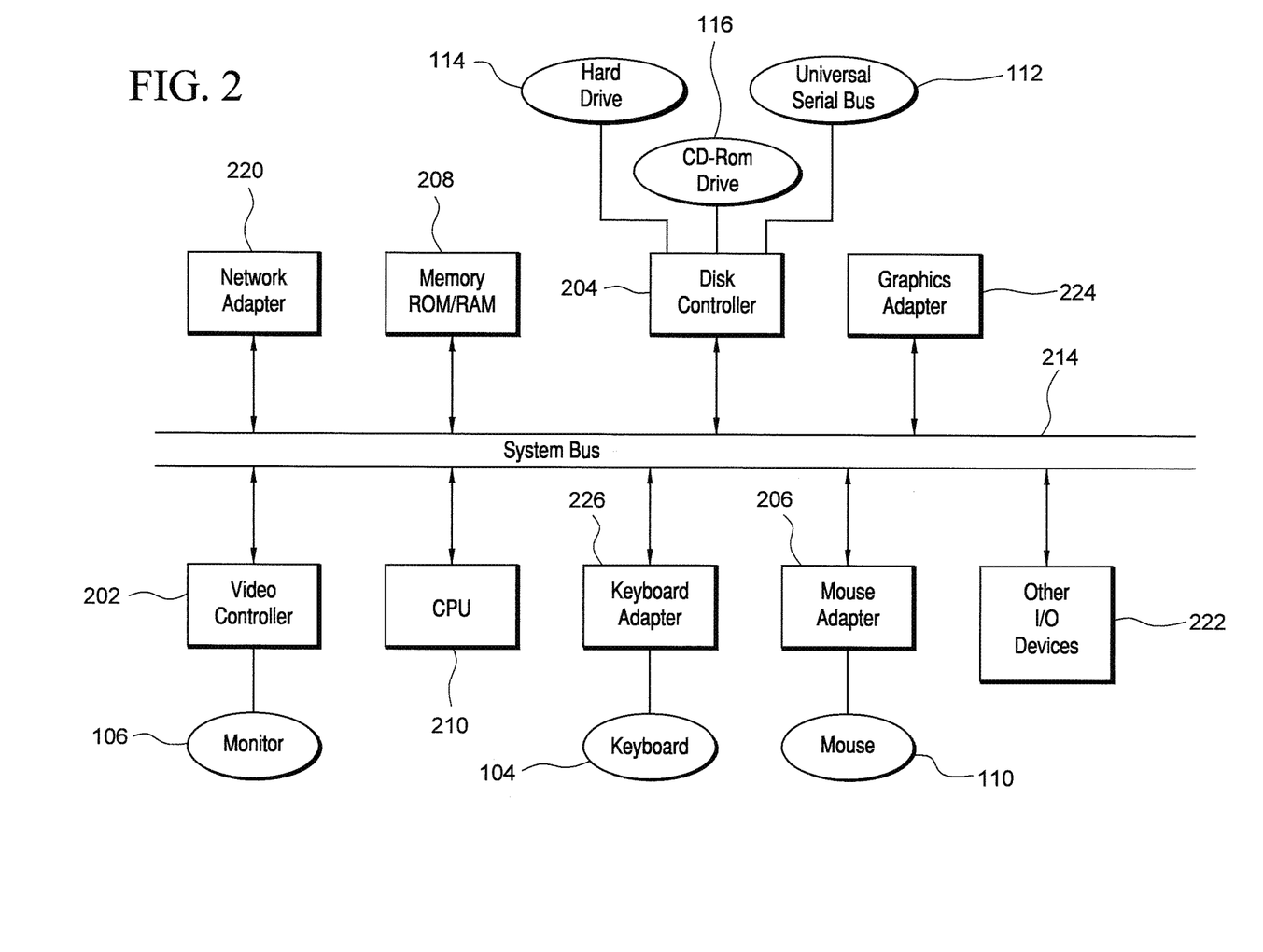
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
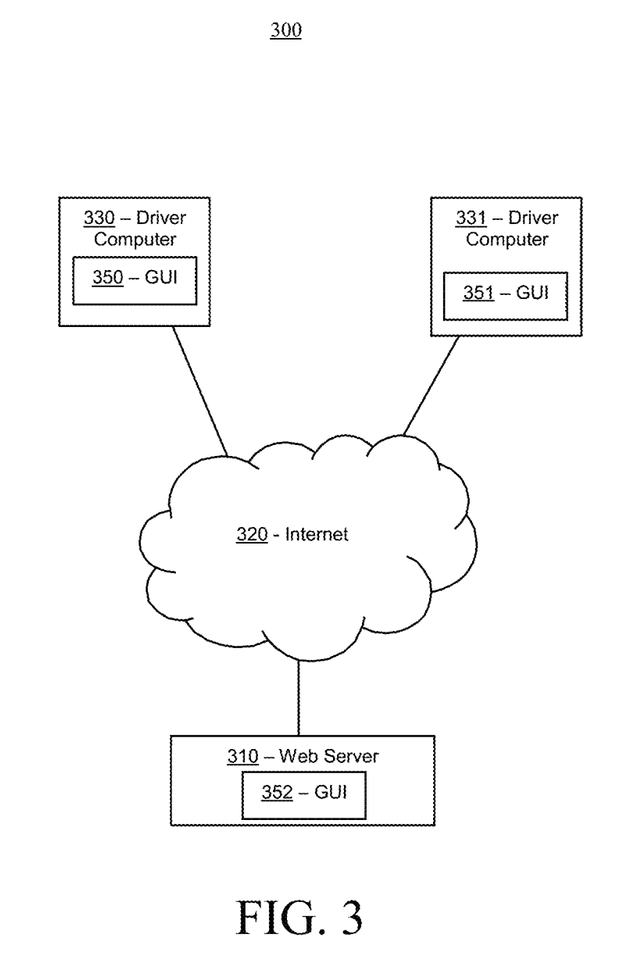
FIG. 3 illustrates a representative block diagram of a system, according to an embodiment.

Turning ahead in the drawings, FIG. 3 illustrates a block diagram of a system 300 that can be employed for vehicle routing, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310 and/or driver computers 330, 331. Web server 310 and/or driver computers 330, 331 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310 and/or driver computers 330, 331. Additional details regarding web server 310 and/or driver computers 330, 331 are described herein.

Driver computers 330, 331 can comprise any of the elements described in relation to computer system 100. In some embodiments, driver computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons. In various embodiments, driver computers 330, 331 can comprise a display that is smaller than monitor 106 (FIG. 1), thereby facilitating mobility.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interfaces ("GUIs") 350-352. In the same or different embodiments, GUIs 350-352 can be part of and/or displayed by web server 310 and/or driver computers 330, 331, which also can be part of system 300. In some embodiments, GUIs 350-352 can comprise text and/or graphics (image) based user interfaces. In the same or different embodiments, GUIs 350-352 can comprise a heads up display ("HUD"). When GUIs 350-352 comprise a HUD, GUIs 350-352 can be projected onto a medium (e.g., glass, plastic, etc.), displayed in midair as a hologram, or displayed on a display (e.g., monitor 106 (FIG. 1)). In various embodiments, GUIs 350-352 can be color, black and white, and/or greyscale. In many embodiments, GUIs 350-352 can comprise an application running on a computer system, such as computer system 100 (FIG. 1), web server 310, and/or driver computers 330, 331. In the same or different embodiments, GUIs 350-352 can comprise a website accessed through internet 320. In some embodiments, GUIs 350-352 can comprise an eCommerce website. In these or other embodiments, GUIs 350-352 can comprise an administrative (e.g., back end) GUI allowing an administrator to modify and/or change one or more settings in system 300. In the same or different embodiments, GUIs 350-352 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 310 can be in data communication through Internet 320 with driver computers (e.g., 330, 331). In certain embodiments, driver computers 330, 331 can be desktop computers, laptop computers, smart phones, tablet devices, and/or other endpoint devices. Web server 310 can host one or more websites. For example, web server 310 can host a fleet management website configured to allow drivers to register for and view routes, in addition to other suitable activities.

In many embodiments, web server 310 and/or driver computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 310 and/or driver computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310 and/or driver computers 330, 331. In a similar manner, the processing module(s) and the memory storage module(s) can be local and/or remote to each other.

In many embodiments, web server 310 and/or driver computers 330, 331 can be configured to communicate with one or more user computers (not shown). In some embodiments, user computers (not shown) also can be referred to as customer computers when interacting with an eCommerce website. In some embodiments, web server 310 can communicate or interface (e.g., interact) with driver computers 330, 331 and/or user computers (not shown) through a network or internet 320. Internet 320 can be an intranet that is not open to the public. In further embodiments, Internet 320 can be a mesh network of individual systems. Accordingly, in many embodiments, web server 310 and/or driver computers 330, 331 (and/or the software used by such systems) can refer to a back end of system 300 operated by an operator and/or administrator of system 300, and user computers (not shown) (and/or the software used by such systems) can refer to a front end of system 300 used by one or more users. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or driver computers 330, 331 also can be configured to communicate with one or more databases. The one or more databases can comprise a product database that contains information about products, items, or SKUs (stock keeping units) sold by a retailer. For example, a database can store information about a size of an item, a weight of an item, whether the item needs to be kept cold, etc.

In many embodiments, one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s). In various embodiments, databases can be stored in a cache (e.g., MegaCache) for immediate retrieval on-demand.

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310 and/or driver computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Past systems for vehicle routing and loading have focused on creating routes and loading plans optimized for shortest and most efficient delivery of items. In many of these systems, the creation stacks of pallets for route construction and delivery was modeled as a 3D bin packing problem that created stacks capable of filling a delivery vehicle. This type of modeling, though, is difficult and slow to optimize due to the multitude of possible solutions. Therefore, described herein are techniques that reduce this 3D packing problem into a 1D or 2D optimization problem. In many embodiments, the techniques described herein can provide a practical application and several technological improvements. In some embodiments, the techniques described herein can provide for more efficient generation and optimization of vehicle routes and loading plans. These techniques described herein can provide a significant improvement over conventional approaches of generating vehicle routes by lowering processing and storage burdens.

Figure 4:
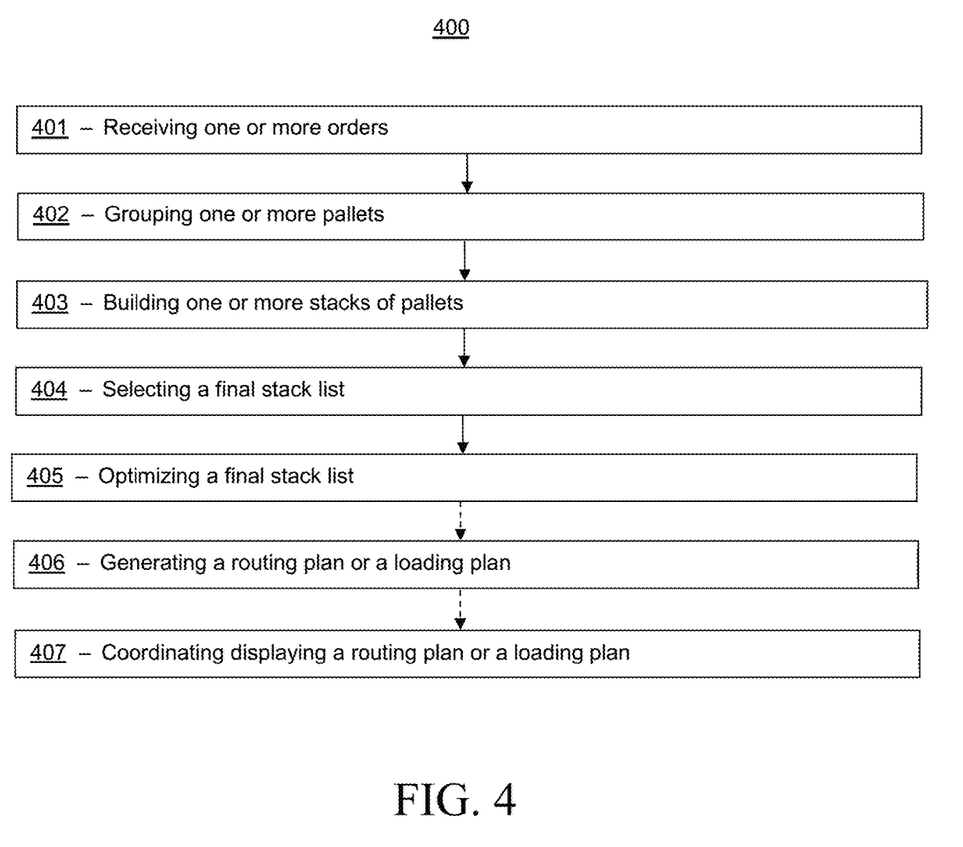
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 and/or driver computers 330, 331 (FIG. 3). The processing module(s) can be similar or identical to the processing module(s) described above with respect to computer system 100 (FIG. 1). In some embodiments, activities of method 400 can be performed in parallel with, before, after, or as a part of other activities of method 400. In various embodiments, one or more activities of method 400 can be inserted into and/or combined with all of or portions of other activities in method 400. For example, portions of activity 404 can be combined with all or a part of one or more of activity 403.

In many embodiments, method 400 can comprise an activity 401 of receiving one or more orders. In various embodiments, one or more orders can comprise one or more items purchased through an eCommerce website. In these or other embodiments, one or more orders can comprise items for re-stocking a warehouse and/or retail store. In further embodiments, one or more orders can comprise one or more stacks of pallets containing one or more items that make up the orders. In many embodiments, one or more stacks of pallets can be associated with only one order. In other embodiments, multiple orders can be placed into one stack.

In various embodiments, one or more orders can be received from one or more algorithms configured to generate all or a part of an order. For example, one or more of U.S. patent application Ser. No. 17/588,324, filed on Jan. 30, 2022; invented by Ou Sun, Aditya Srinivasan, Jing Huang, and Mingang Fu; and titled System and Methods for Vehicle Routing; which is incorporated by this reference in its entirety, can generate elements of orders used in activity 401. As another example, U.S. patent application Ser. No. 17/588,331, filed on Jan. 30, 2022; invented by Ou Sun, Aditya Srinivasan, Minghui Lui, Jing Huang, and Mingang Fu; and titled System and Methods for Vehicle Routing; which is incorporated by this reference in their entirety, can generate a vehicle route used in activity 401.

In many embodiments, method 400 can comprise an activity 402 of grouping one or more pallets. In various embodiments, one or more pallets can be grouped by one or more qualities of a pallet. For example, one or more pallets can be grouped by shipping destination and/or temperature sensitivity (hot, refrigerated, frozen, room temperature, etc) In this way, stacks generated in method 400 heading to the same destination can be grouped together for easy unloading while making sure any perishable items remain temperature compliant.

In many embodiments, method 400 can comprise an activity 403 of building one or more stacks of pallets. In many embodiments, one or more portions of activity 403 can be repeated until all pallets and/or orders are assigned to a stack. In various embodiments, one or more portions of activity 403 can be performed for a certain time limit or for a predetermined number of cycles. A stack of pallets can have a number of limitations placed on it based on one or more qualities of the stack. For example, a stack of pallets can be limited by total size, weight, number, type (top of stack only vs bottom of stack only) etc. In various embodiments, a stack of pallets can be limited by a type of delivery vehicle used for delivery. For example, a stack of pallets delivered by a semi-trailer can be larger than a stack of pallets delivered by a cargo van. In many embodiments, stacks of pallets can be built for one or more groups created in activity 402. A number of different stacking models can be used to build one or more stacks of pallets. For example, a first fit algorithm, a best fit algorithm, and/or a worst fit algorithm can be used to build one or more stacks of pallets. In some embodiments, a new stack can be initialized with a pallet when no stacks exist or when a pallet has no available stacks according to a stacking model.

In many embodiments, a best fit algorithm can comprise inserting a pallet into a stack with enough space to accommodate a pallet. For example, if stacks are limited by weight, a pallet can be inserted into a stack with the most available weight (e.g., a lightest stack) under a weight limit. In these or other embodiments, a stack can be inserted into a first stack in a sequence of stacks (e.g., a sequence in which stacks are received or created). In various embodiments, a best fit algorithm can comprise inserting a pallet into a stack where it will fit tightest (e.g., where it will product the least amount of unused space in a stack). In these or other embodiments, a worst fit algorithm can comprise inserting a palled into a stack where it will fit loosest (e.g., where it will leave the most amount of unused space in a stack). In some embodiments, a best fit algorithm or a worst fit algorithm can be performed faster using one or more sorting algorithms to sort stacks by unused space. In various embodiments, a binary tree sorting algorithm can be used to perform a best fit algorithm or a worst fit algorithm in O(log N) time. In other words, as time increases linearly, a number of stacks sorted increases exponentially. For example, if 1 second to sort 10 stacks, it will take 2 seconds to sort 100 stacks, 3 seconds to sort 1000 stacks, etc.

In many embodiments, method 400 can comprise an activity 404 of selecting a final stack list. In some embodiments, a final stack list can comprise a list of stacks created by a most efficient stacking algorithm. For example, a final stack list can be a list of stacks created by a best fit algorithm. In various embodiments, a most efficient stacking algorithm can comprise a stacking algorithm that produces a lowest number of stacks.

In many embodiments, method 400 can comprise an activity 405 of optimizing a final stack list. In many embodiments, a final stack list can be generated using one or more probabilistic model. Generally speaking, a probabilistic model used in activity 405 can be configured to optimize a final stack list to minimize a number of stacks. In many embodiments, a probabilistic model can comprise simulated annealing. From a high level, simulated annealing can comprise a metaheuristic for approximating a global optimization in a large search space (e.g., among a large number of orders). Optimization of a stack list using simulated annealing can involve evaluating the neighbors of a stack, which are new stacks produced through altering a given stack. At each iteration of a simulated annealing algorithm, randomly creates a stack similar to a current stack, measures a quality of the similar stack, and moves to it according to one or more temperature-dependent probabilities of selecting better or worse solutions given the quality.

In some embodiments, method 400 can optionally comprise activity 406 of generating a routing plan or a loading plan. In some embodiments, a routing plan can be constructed using final stack list as determined via one or more of activities 404-405. In various embodiments, a routing plan can comprise a sequence of delivery stops and/or one or more stacks associated with each stop. In many embodiments, a loading plan can comprise a list of stacks and/or their respective locations within a delivery vehicle. For example, a loading plan can comprise a position of a stack (e.g., row and column, numbered spot, bin, bag, etc.) and/or an orientation of a stack (facing left, right, front back diagonal, etc.). In some embodiments, stacks to be delivered to the same destination can be grouped together in a loading plan. In these or other embodiments, a loading plan can be ordered in reverse order from a route. In this way, orders to be delivered last are loaded into a furthest portion of a delivery vehicle (e.g., a tractor trailer) first. In various embodiments, a routing plan and/or a loading plan can be configured to be transmitted to one or more autonomous and/or semi-autonomous systems for execution. For example, a loading plan can be sent to an automated warehouse system, which locates and/or loads orders in a route into a delivery vehicle. As another example, a routing plan can be transmitted to one or more autonomous delivery vehicles, which then can travel the route and deliver orders.

In some embodiments, method 400 can optionally comprise activity 407 of coordinating displaying a routing plan or a loading plan. In many embodiments, a routing plan can be displayed on an electronic device of a delivery driver (e.g., driver computer 330, 331). In some embodiments, a routing plan can be displayed as one or more lists of delivery stops. In various embodiments, a routing plan can be displayed on a mapping program (e.g., Google Maps, Apple Maps, etc.) and/or as turn-by-turn navigation. In many embodiments, a loading plan can be displayed on an electronic device of a loader and/or dockworker. In some embodiments, a loading plan can be displayed as one or more lists of stacks and their location in a delivery vehicle. In various embodiments, a loading plan can be displayed on an augmented reality system (e.g., augmented reality glasses, through a digital camera, etc.) viewed inside a delivery vehicle. In this way, a loader and/or dockworker can be instructed on how to execute a loading plan.

Figure 5:
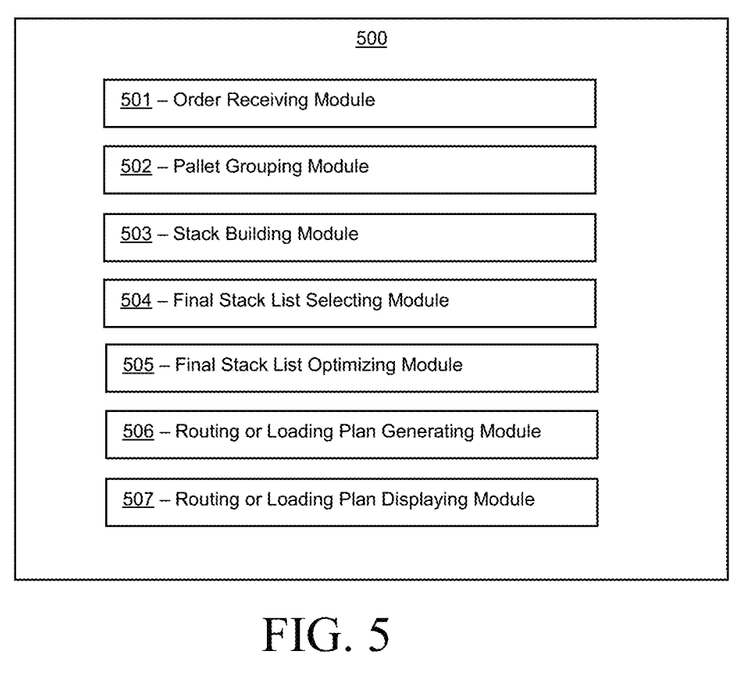
FIG. 5 illustrates a representative block diagram of a system, according to an additional embodiment.

Turning ahead in the drawings, FIG. 5 illustrates a block diagram of a system 500 that can be employed for vehicle routing. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500. In some embodiments, one or more portions of system 500 can be part of or in communication with web server 310 (FIG. 3) and/or driver computers 350, 351. (FIG. 3).

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as order receiving module 501. In many embodiments, order receiving module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as pallet grouping module 502. In many embodiments, pallet grouping module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as stack building module 503. In many embodiments, stack building module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as final stack list selecting module 504. In many embodiments, final stack list selecting module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as final stack list optimizing module 505. In many embodiments, final stack list optimizing module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as routing or loading plan generating module 506. In many embodiments, routing or loading plan generating module 506 can store computing instructions configured to run on one or more processing modules and perform one or more acts of method 400 (FIG. 4) (e.g., activity 406 (FIG. 4)).

In many embodiments, system 500 can comprise non-transitory memory storage module 507. Memory storage module 507 can be referred to as routing or loading plan displaying module 507. In many embodiments, routing or loading plan displaying module 505 can store computing instructions configured to run on one or more processing modules and perform one or more acts of method 400 (FIG. 4) (e.g., activity 407 (FIG. 4)).

Although systems and methods for vehicle routing have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform operations comprising:
receiving one or more orders comprising a list of pallets;
grouping each pallet of the pallets into one or more groups using one or more respective qualities of each respective pallet;
for each group of the one or more groups, building stacks of pallets using at least three different stacking models;
selecting a final stack list of a model of the at least three different stacking models having a lowest number of stacks;

optimizing the final stack list using a probabilistic model;

using the final stack list, as optimized, to generate a loading plan, wherein the loading plan comprises respective locations where each of one or more stacks of the final stack list is to be loaded within a delivery vehicle; and displaying, on an electronic device of a user, an augmented reality environment of an inside view of a respective delivery vehicle showing respective locations for loading the one or more stacks within the respective delivery vehicle to allow the user to view the display to execute the loading plan within the respective delivery vehicle.

2. The system of claim 1, wherein the computing instructions, when executed on the one or more processors, further cause the one or more processors to perform operations comprising:

generating a routing plan comprising a sequence of stops, wherein each stop of the sequence of stops is associated with one or more respective stacks of the stacks based on at least the final stack list or the loading plan;

transmitting the routing plan to an electronic device of the respective delivery vehicle to deliver the one or more respective stacks associated with each stop, wherein the respective delivery vehicle comprises an autonomous vehicle; and displaying the routing plan for delivery of the one or more stacks in the loading plan on the electronic device of the delivery vehicle.

3. The system of claim 1, wherein a stacking model of the at least three different stacking models comprises a first fit algorithm.

4. The system of claim 3, wherein the first fit algorithm comprises:

inserting a pallet into a first stack in a sequence of stacks having enough space to accommodate the pallet.

5. The system of claim 1, wherein a stacking model of the at least three different stacking models comprises a best fit algorithm.

6. The system of claim 5, wherein the best fit algorithm comprises:

inserting a pallet into a stack having a least amount of remaining space in the stack after insertion of the pallet.

7. The system of claim 1, wherein a stacking model of the at least three different stacking models comprises a worst fit algorithm.

8. The system of claim 7, wherein the worst fit algorithm comprises:

inserting a pallet into a stack having a most amount of remaining space in the stack after insertion of the pallet.

9. The system of claim 1, wherein the probabilistic model comprises simulated annealing.

10. The system of claim 1, wherein building the stacks of pallets using the at least three different stacking models comprises:

initializing a new stack when a pallet does not fit in any stack according to at least one of the at least three different stacking models.

11. A method implemented via execution of computing instructions configured to run at one or more processors and configured to be stored at non-transitory computer-readable media, the method comprising:

receiving one or more orders comprising a list of pallets;

grouping each pallet of the pallets into one or more groups using one or more respective qualities of each respective pallet;

for each group of the one or more groups, building stacks of pallets using at least three different stacking models;

selecting a final stack list of a model of the at least three different stacking models having a lowest number of stacks;

optimizing the final stack list using a probabilistic model;

using the final stack list, as optimized, to generate a loading plan, wherein the loading plan comprises respective locations where each of one or more stacks of the final stack list is to be loaded within a delivery vehicle; and displaying, on an electronic device of a user, an augmented reality environment of an inside view of a respective delivery vehicle showing respective locations for loading the one or more stacks within the respective delivery vehicle to allow the user to view the display to execute the loading plan within the respective delivery vehicle.

12. The method of claim 11 further comprising:

generating a routing plan comprising a sequence of stops, wherein each stop of the sequence of stops is associated with one or more respective stacks of the stacks based on at least the final stack list or the loading plan;

transmitting the routing plan to an electronic device of the respective delivery vehicle to deliver the one or more respective stacks associated with each stop, wherein the respective delivery vehicle comprises an autonomous vehicle; and displaying the routing plan for delivery of the one or more stacks in the loading plan on the electronic device of the delivery vehicle.

13. The method of claim 11, wherein a stacking model of the at least three different stacking models comprises a first fit algorithm.

14. The method of claim 13, wherein the first fit algorithm comprises:

inserting a pallet into a first stack in a sequence of stacks having enough space to accommodate the pallet.

15. The method of claim 11, wherein a stacking model of the at least three different stacking models comprises a best fit algorithm.

16. The method of claim 15, wherein the best fit algorithm comprises:

inserting a pallet into a stack having a least amount of remaining space in the stack after insertion of the pallet.

17. The method of claim 11, wherein a stacking model of the at least three different stacking models comprises a worst fit algorithm.

18. The method of claim 17, wherein the worst fit algorithm comprises:

inserting a pallet into a stack having a most amount of remaining space in the stack after insertion of the pallet.

19. The system of claim 1, wherein the probabilistic model comprises simulated annealing.

20. The method of claim 11, wherein building the stacks of pallets using the at least three different stacking models comprises:

initializing a new stack when a pallet does not fit in any stack according to at least one of the at least three different stacking models.

* * * * *